United States Patent [19]
Lin

[11] Patent Number: 5,638,884
[45] Date of Patent: Jun. 17, 1997

[54] ELECTRICAL SUNSHADE ASSEMBLY FOR SHIELDING A WINDOW OF AN AUTOMOBILE

[76] Inventor: King-Long Lin, 4F, No. 12, Lane 71, Chung-Cheng N. Rd., San-Chung City, Taipei Hsien, Taiwan

[21] Appl. No.: 523,445

[22] Filed: Sep. 5, 1995

[51] Int. Cl.⁶ ........................................................ B60J 1/20
[52] U.S. Cl. ...................... 160/370.22; 160/265; 160/310
[58] Field of Search ........................... 160/370.22, 265, 160/310, 68, 72, 71, 262, 82, 70; 296/97.4, 97.8

[56] References Cited

U.S. PATENT DOCUMENTS

| | | |
|---|---|---|
| 1,505,386 | 8/1924 | Golding et al. . |
| 3,074,474 | 1/1963 | Dunn . |
| 3,364,973 | 1/1968 | Railson ............................ 160/71 X |
| 3,918,511 | 11/1975 | Upton, Jr. ........................ 160/71 X |
| 4,836,263 | 6/1989 | Ament ........................ 160/370.22 X |
| 5,033,527 | 7/1991 | Ouvard et al. ..................... 160/265 X |
| 5,036,898 | 8/1991 | Chen ........................ 160/370.22 X |
| 5,291,934 | 3/1994 | Ouvard et al. .............. 160/370.22 X |

FOREIGN PATENT DOCUMENTS

| | | |
|---|---|---|
| 562668 | 7/1944 | United Kingdom . |
| 570456 | 7/1945 | United Kingdom . |

Primary Examiner—Blair Johnson
Attorney, Agent, or Firm—Baker & Botts, L.L.P.

[57] ABSTRACT

An electrical sunshade assembly includes a tubular mounting unit adapted to be secured in an automobile adjacent to a window of the latter and formed with a longitudinally extending slot. A pinion is disposed rotatably in the mounting unit and is driven to rotate in opposite first and second directions. Two racks are disposed movably in the mounting unit on two sides of the pinion. Each rack meshes with the pinion and has a connecting end portion. Rotation of the pinion in the first direction causes the connecting end portions of the racks to move away from each other, while rotation of the pinion in the second direction causes the connecting end portions to move toward each other. A screen unit is located adjacent to the slot of the mounting unit and includes a sun screen and an axially rotatable roller which is biased to wind the sun screen normally thereon. Each of two linking rods has a first end portion connected pivotally to the sun screen and a second end portion connected pivotally to the connecting end portion of a respective one of the racks such that movement of the connecting end portions of the racks away from each other causes unwinding of the sun screen from the roller to shield the window and such that movement of the connecting end portions toward each other causes winding of the screen on the roller.

1 Claim, 4 Drawing Sheets

# ELECTRICAL SUNSHADE ASSEMBLY FOR SHIELDING A WINDOW OF AN AUTOMOBILE

BACKGROUND OF THE INVENTION

1. Field Of The Invention

This invention relates to an electrical sunshade assembly for shielding a window of an automobile, more particularly to an electrical sunshade assembly which is easy to assemble and which can be manufactured at a relatively low cost.

2. Description Of The Related Art

Most conventional sunshades for shielding a window of an automobile are operated manually. However, such sunshades are inconvenient to use, especially by the driver.

To overcome the problem of inconvenient operation of the conventional sunshades, an electrical sunshade assembly has been proposed. The known electrical sunshade assembly includes a tubular mounting unit adapted to be mounted securely in the automobile adjacent to the window. The mounting unit is formed with a longitudinally extending slot. A longitudinally extending rotatable shaft extends rotatably in the mounting unit between two ends of the mounting unit. The shaft has two opposed end portions that are threaded in opposite directions. Two movable members are mounted respectively and threadably on the end portions of the shaft and are restricted to rotate synchronously with the shaft such that rotation of the shaft results in movement of the movable members along the shaft. The electrical sunshade assembly is provided with a driving unit which includes a bidirectional motor unit for driving the shaft to rotate in opposed first and second direction. Rotation of the shaft in the first direction causes movement of the movable members away from each other, while rotation of the shaft in the second direction causes movement of the movable members toward each other. A screen unit is located adjacent to the slot of the mounting unit and is parallel to the mounting unit. The screen unit includes an axially rotatable roller and a sun screen which has a first end portion connected to the roller and a second end portion. The roller is biased to wind the sun screen normally thereon. Each of two linking rods has a first end portion connected pivotally to the second end portion of the sun screen at a respective one of two opposed edges of the sun screen, and a second end portion connected pivotally to a respective one of the movable members such that movement of the movable members away from each other causes unwinding of the sun screen from the roller to shield the window and such that movement of the movable members toward each other causes winding of the sun screen on the roller.

It should be noted that the manufacturing cost of the shaft is relatively high, thereby increasing the manufacturing cost of the known electrical sunshade assembly.

SUMMARY OF THE INVENTION

Therefore, the objective of the present invention is to provide an electrical sunshade assembly for shielding a window of an automobile, which electrical sunshade assembly can be manufactured at a lower cost.

According to the present invention, an electrical sunshade assembly for shielding a window of an automobile includes a tubular mounting unit adapted to be mounted securely in the automobile adjacent to the window. The mounting unit is formed with a longitudinally extending slot. A driving unit includes a pinion which is disposed rotatably in an intermediate portion of the mounting unit and which has an axis of rotation transverse to a longitudinal axis of the mounting unit, and a bidirectional motor unit for driving the pinion to rotate in opposite first and second directions. First and second racks are disposed movably in the mounting unit on two sides of the pinion. Each of the racks meshes with the pinion and has a connecting end portion. Rotation of the pinion in the first direction causes the connecting end portions of the racks to move away from each other. Rotation of the pinion in the second direction causes the connecting end portions to move toward each other. A screen unit is located adjacent to the slot of the mounting unit and is parallel to the mounting unit. The screen unit includes an axially rotatable roller and a sun screen which has a first end portion connected to the roller and a second end portion. The roller is biased to wind the sun screen normally thereon. Each of two linking rods has a first end portion connected pivotally to the second end portion of the sun screen at a respective one of two opposed edges of the sun screen, and a second end portion connected pivotally to the connecting end portion of a respective one of the racks such that movement of the connecting end portions of the racks away from each other causes unwinding of the sun screen from the roller to shield the window and such that movement of the connecting end portions of the racks toward each other causes winding of the sun screen on the roller.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENT

Figure 1:
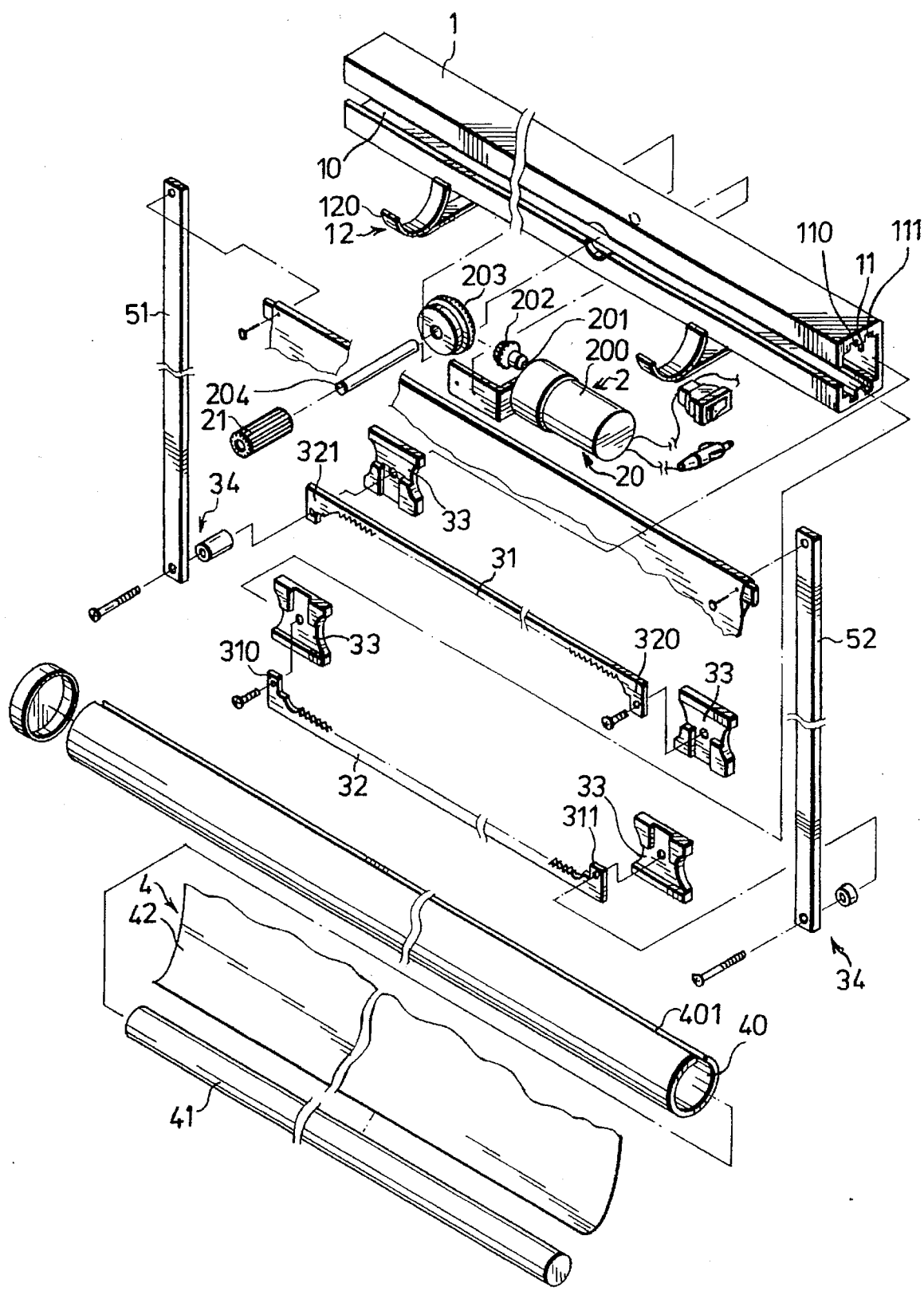
FIG. 1 is an exploded perspective view of an electrical sunshade assembly for shielding a window of an automobile in accordance with a first embodiment of the present invention.
Figure 2:
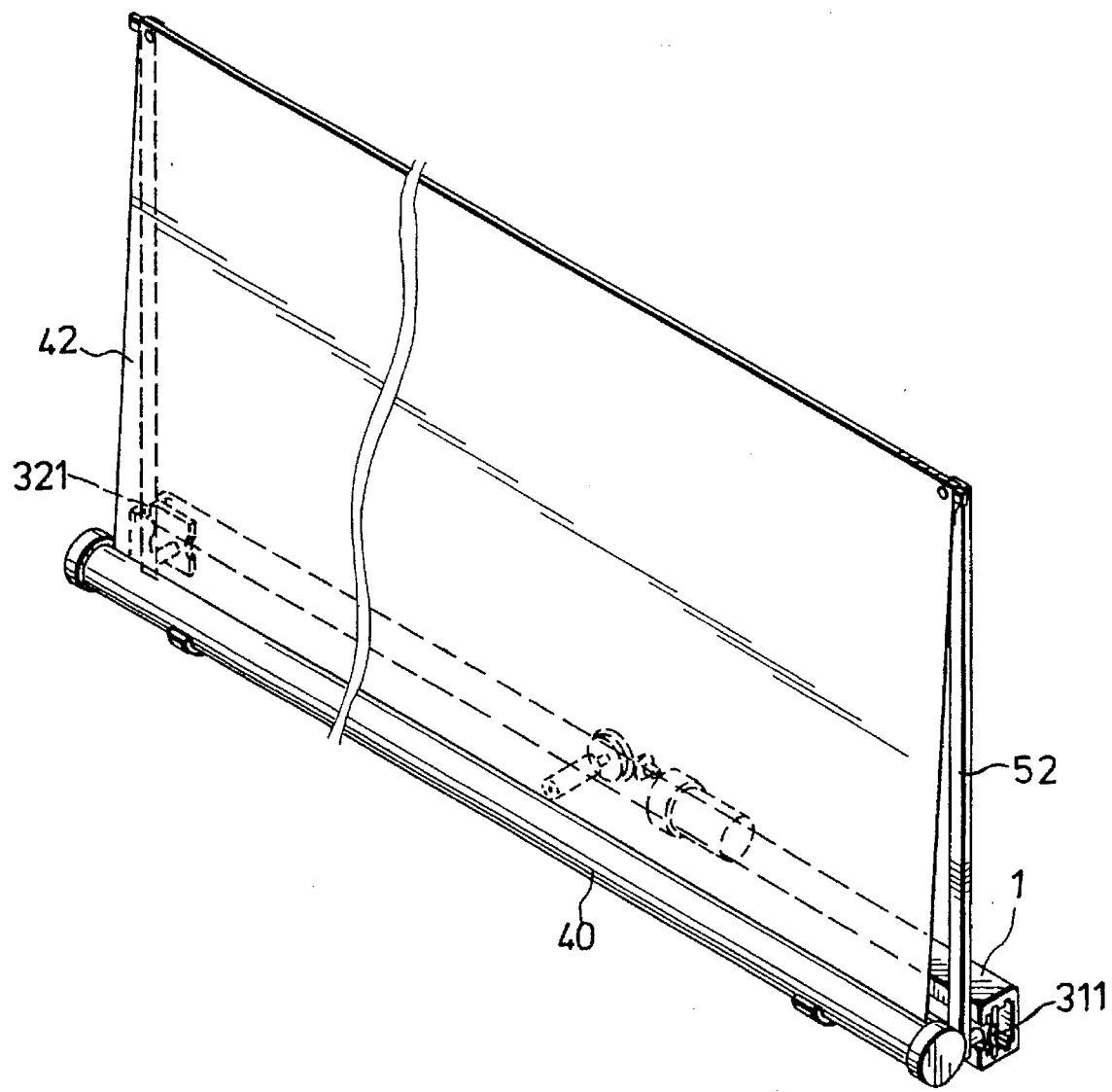
FIG. 2 is a perspective view of the electrical sunshade assembly according to the first embodiment of the present invention.

Referring to FIGS. 1 and 2, an electrical sunshade assembly for shielding a window (not shown) of an automobile (not shown) in accordance with a first embodiment of the present invention includes a tubular mounting unit 1, a driving unit 2, first and second racks 31,32, a screen unit 4 and a pair of elongated linking rods 51,52.

The tubular mounting unit 1 is adapted to be mounted securely in the automobile adjacent to the window. For example, the mounting unit 1 can be positioned on the rear shelf covering (not shown) or on the door (not shown). The mounting unit 1 is formed with a longitudinally extending slot 10 and has opposite interior surfaces 11 on two sides of the slot 10. Each of the interior surfaces 11 is formed with longitudinally extending first groove 110 and a longitudinally extending second groove 111 which is located farther away from the slot 10 than the first groove 110. The mounting unit 1 is provided with a clamping unit 12 which includes two spaced C-shaped clamps 120 that extend respectively from two ends of the mounting unit 1 and that are adjacent to the slot 10.

The driving unit 2 includes a bidirectional motor unit 20 and a pinion 21. In the present embodiment, the bidirectional motor unit 20 includes a bidirectional motor 200 which is mounted on the mounting unit 1 opposite to the slot 10 and which has a driving shaft 201 that extends in a direction parallel to a longitudinal axis of the mounting unit 1. The motor 200 is connected electrically to a power source (not shown) of the automobile via a switch unit 2001. A first bevel gear 202 is secured axially on the driving shaft 201. A rotatable shaft 204 has an axis of rotation transverse to the longitudinal axis of the mounting unit 1 and extends rotatably into the mounting unit 1 such that a first end portion of the rotatable shaft 204 is disposed at an intermediate portion of the mounting unit 1 and such that a second end portion of the rotatable shaft 204 extends out of the mounting unit 1 and is adjacent to the first bevel gear 202. A second bevel gear 203 is secured axially on the second end portion of the rotatable shaft 204 and meshes with the first bevel gear 203. The pinion 21 is secured axially on the first end portion of the rotatable shaft 204. Thus, the pinion 21 can be driven to rotate in opposite first and second directions by the motor 200 through the rotation of the first and second bevel gears, 202 and 203.

The first and second racks, 31 and 32, are disposed movably in the mounting unit 1 on two sides of the pinion 21. Each of the racks 31,32 meshes with the pinion 21 and has a connecting end portion 310,320 and a distal end portion 311,321 opposite to the connecting end portion 310,320. Each of the racks 31,32 further has two slide pieces 33 which are secured respectively to the connecting and distal end portions, 310,320 and 311,321, thereof by means of screws 34. The slide pieces 33 of the first rack 31 extend slidably into the first grooves 110 to guide movement of the first rack 31 in the mounting unit 1. The slide pieces 33 of the second rack 32 extend slidably into the second grooves 111 to guide movement of the second rack 32 in the mounting unit 1.

The screen unit 4 includes a housing 40 which is clamped by the clamping unit 12 so as to be located adjacent to the slot 10 of the mounting unit 1 and which is parallel to the mounting unit 1. An axially rotatable roller 41 is disposed rotatably in the housing 40. A sun screen 42 has a first end portion which is connected to the roller 41 and a second end portion. The roller 41 is biased to wind the sun screen 42 normally thereon. The housing 40 is formed with a longitudinally extending slot 401 via which the second end portion of the sun screen 42 extends out of the housing 40.

Each of the linking rods 51,52 has a first end portion which is connected pivotally to the second end portion of the sun screen 42 at a respective one of two opposed edges of the sun screen 42, and a second end portion which is connected pivotally to the connecting end portion 310,320 of a respective one of the racks 31,32 such that movement of the connecting end portions 310,320 of the racks 31,32 away each other causes unwinding of the sun screen 42 from the roller 41 to shield the window of the automobile, and such that movement of the connecting end portions 310,320 of the racks 31,32 toward each other causes winding of the sun screen 42 on the roller 41.

Figure 3:
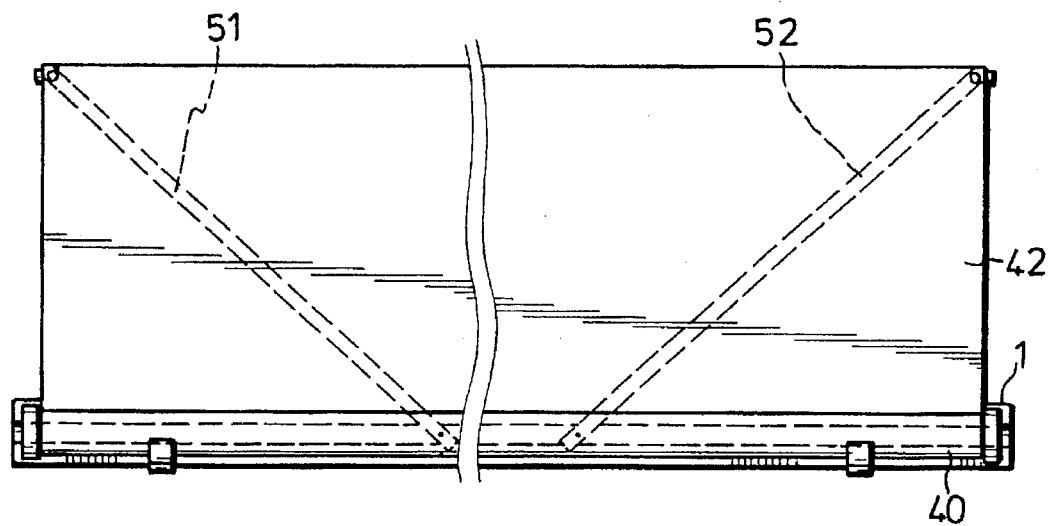
FIG. 3 illustrates the first embodiment when a sun screen of a screen unit thereof is partly unwound from an axially rotatable roller of the screen unit.
Figure 4:
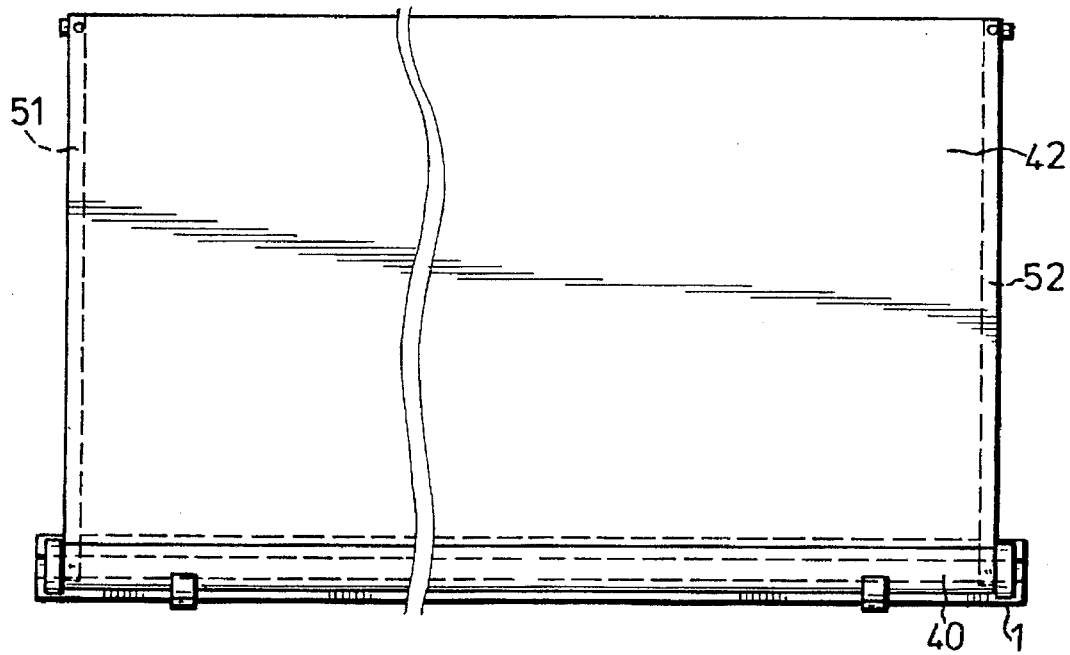
FIG. 4 illustrates the sun screen of the screen unit of the first embodiment when fully unwound from the roller of the screen unit.

Referring now to FIGS. 2, 3 and 4, supposing that the sun screen 42 is initially wound on the roller selective operation of the switch unit 2001 causes the motor unit 20 to drive the pinion 21 to rotate in the first direction, thereby causing the connecting end portions 310,320 to move away from each other. Since the first end portion of each linking rod 51,52 is connected pivotally to the second end portion of the sun screen 42, and since the second end portion of each linking rod 51,52 is connected pivotally to the connecting end portion 310,320 of a respective one of the racks 31,32, movement of the connecting end portions 310,320 of the racks 31,32 away from each other unwinds the sun screen 42 from the roller 41 to shield the window of the automobile. As best shown in FIG. 4, the linking rods 51,52 are generally perpendicular to the mounting unit 1 when the sun screen 42 is unwound fully from the roller 41.

Figure 5:
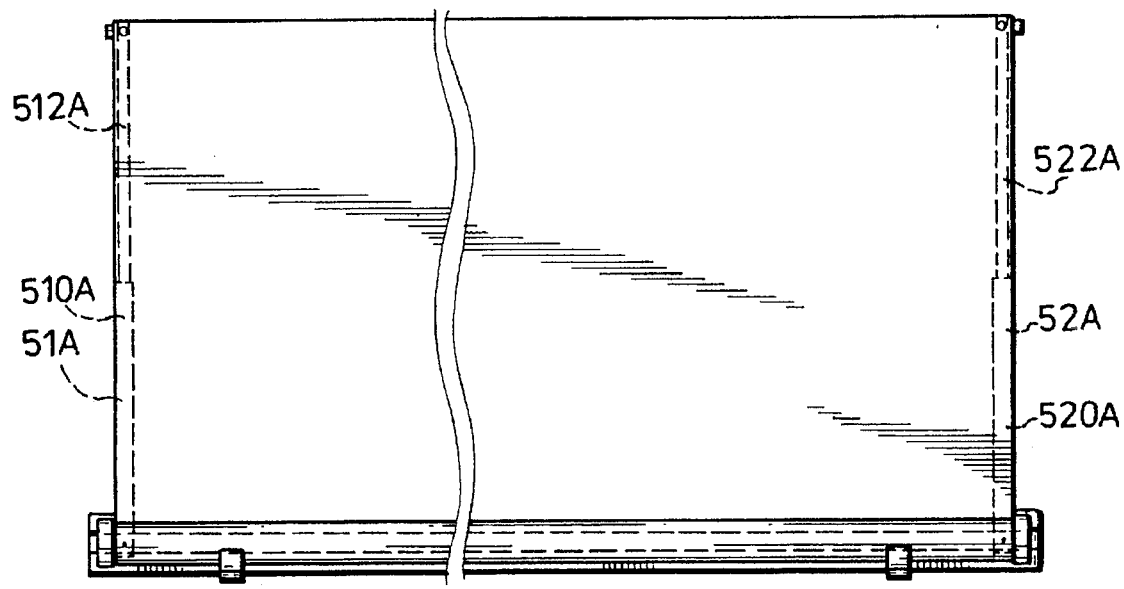
FIG. 5 illustrates the sun screen of the screen unit of the electrical sunshade assembly according to a second embodiment of the present invention when fully unwound from the roller of the screen unit.
Figure 6:
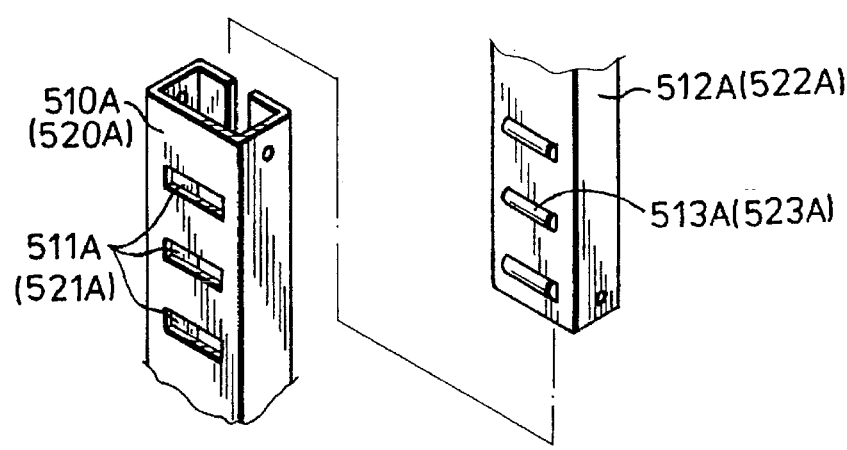
FIG. 6 is a perspective view showing a portion of one of the linking rods of the electrical sunshade assembly according to the second embodiment of the present invention.

Referring now to FIGS. 5 and 6, a second embodiment of the present invention is shown. In the present embodiment, each of the linking rods (51A,52A) is telescopic in order to suit the window size of any automobile model. Each of the linking rods (51A,52A) includes a first rod section (510A, 520A) which is formed with a row of longitudinally spaced engaging holes (511A,521A), and a second rod section (512A,522A) on which the first rod section (510A,520A) is sleeved movably. The second rod section (512A,522A) of each linking rod (51A,52A) is provided with a spring-loaded projection (513A,523A) which engages selectively one of the engaging holes (511A,521A) so as to vary the length of the linking rod (51A,52A).

The mounting unit 1 of the electrical sunshade assembly of the present invention can be mounted pivotally to a positioning unit (not shown) which is fixed in the automobile so as to permit variation of the angle formed between the sun screen 42 and the window of the automobile in order to be compatible with any model of automobile.

It should be appreciated that, since the electrical sunshade assembly of the present invention employs inexpensive racks, the manufacturing cost of the present invention is thus lower when compared with the previously described prior art.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. An electrical sunshade assembly for shielding a window of an automobile, comprising:
   a tubular mounting unit adapted to be mounted securely in the automobile adjacent to the window, said mounting unit being formed with a longitudinally extending slot;
   a driving unit including a pinion which is disposed rotatably in an intermediate portion of said mounting unit and which has an axis of rotation transverse to a longitudinal axis of said mounting unit, and a bidirectional motor unit for driving said pinion to rotate in opposite first and second directions;
   first and second racks disposed movably in said mounting unit on two sides of said pinion, each of said racks meshing with said pinion and having a connecting end portion, rotation of said pinion in said first direction causing said connecting end portions of said racks to move away from each other, rotation of said pinion in said second direction causing said connecting end portions to move toward each other;

a screen unit located adjacent to said slot of said mounting unit and parallel to said mounting unit, said screen unit including an axially rotatable roller and a sun screen which has a first end portion connected to said roller and a second end portion, said roller being biased to wind said sun screen normally thereon; and a pair of elongated linking rods, each of said linking rods having a first end portion connected pivotally to said second end portion of said sun screen at a respective one of two opposed edges of said sun screen, and a second end portion connected pivotally to said connecting end portion of a respective one of said racks away from each other causes unwinding of said sun screen from said roller to shield the window and such that movement of said connecting end portions of said racks toward each other causes winding of said sun screen on said roller, wherein said mounting unit has opposite interior surfaces on two sides of said slot, each of said interior surfaces being formed with a longitudinally extending first groove and a longitudinally extending second groove which is located farther away from said slot than said first groove, each of said racks further having a distal end portion opposite to said connecting end portion thereof and two slide pieces secured respectively to said connecting and distal end portions thereof, said slide pieces of said first rack extending slidably into said first grooves to guide movement of said first rack in said mounting unit, said slide pieces of said second rack extending slidably into said second grooves to guide movement of said second rack in said mounting unit.

* * * * *